United States Patent [19]

Arico

[11] 3,961,810

[45] June 8, 1976

[54] BICYCLE SAFETY AND CONVERSION WHEEL

[76] Inventor: Larry L. Arico, 630 - 3rd St., Hermosa Beach, Calif. 90254

[22] Filed: Oct. 7, 1974

[21] Appl. No.: 512,628

Related U.S. Application Data

[63] Continuation-in-part of Ser. No. 392,267, Aug. 28, 1973, abandoned.

[52] U.S. Cl. ............................ 280/239; 280/289 G
[51] Int. Cl.² ........................................ B62D 63/00
[58] Field of Search .......... 280/239, 289, 291, 293, 280/295, 202, 1.184, 1.189

[56] References Cited
UNITED STATES PATENTS

| | | | |
|---|---|---|---|
| 374,287 | 12/1887 | Benfield | 280/291 |
| 603,735 | 5/1898 | Porter | 280/289 |
| 2,944,590 | 7/1960 | Cooper | 280/202 |
| 3,096,100 | 7/1963 | Clarke et al. | 280/1.184 |
| 3,284,096 | 11/1966 | Hansen et al. | 280/239 |
| 3,653,679 | 4/1972 | Howard | 280/239 |
| 3,888,511 | 6/1975 | Parrilla | 280/239 |

Primary Examiner—M. H. Wood, Jr.
Assistant Examiner—J. D. Rubenstein
Attorney, Agent, or Firm—John Holtrichter, Jr.

[57] ABSTRACT

Wheel for bicycle is mounted upon a wheel-mounting structure which is rigidly attached to the bicycle frame. The wheel is positioned so that, when the bicycle tilts backward to a semi-stable position on its rear wheel, the bicycle safety and conversion wheel of this invention prevents excessive further tiltback. Furthermore, the structure has a step above the wheel so that the bicycle may be ridden in an unconventional manner upon its rear wheel and its conversion wheel.

3 Claims, 8 Drawing Figures

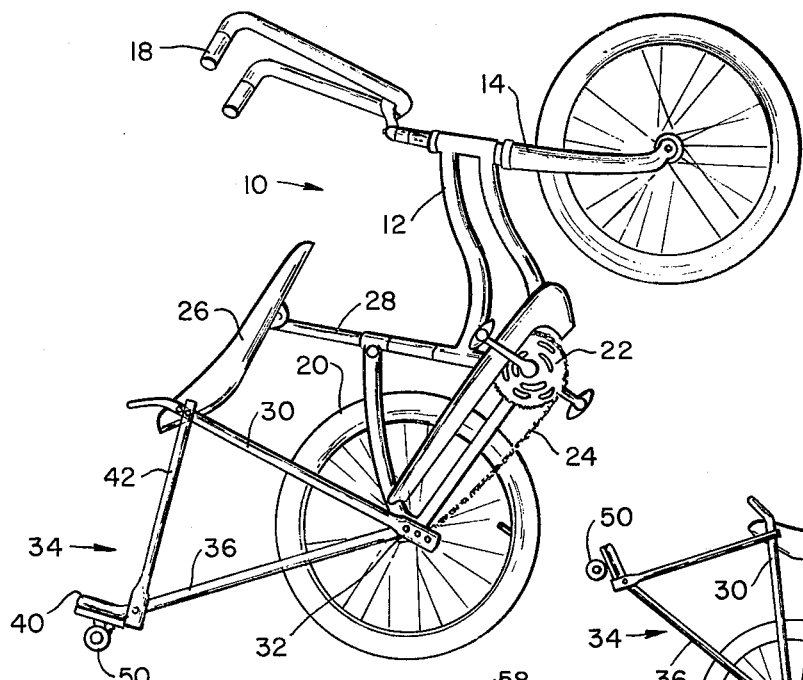
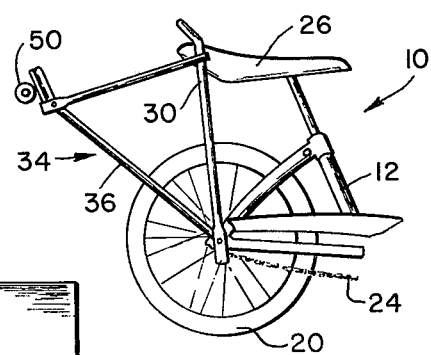
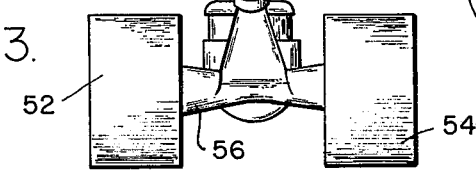
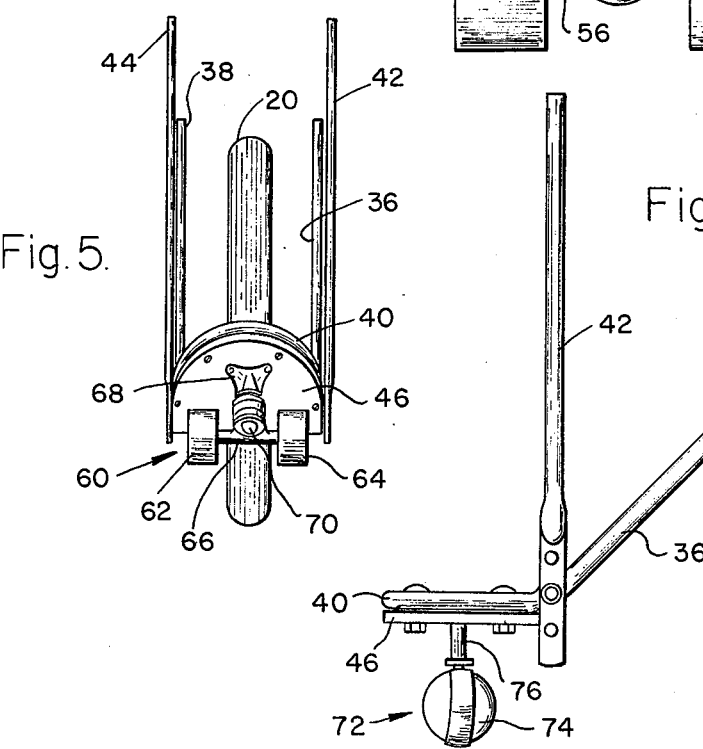
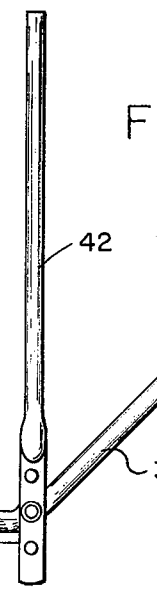
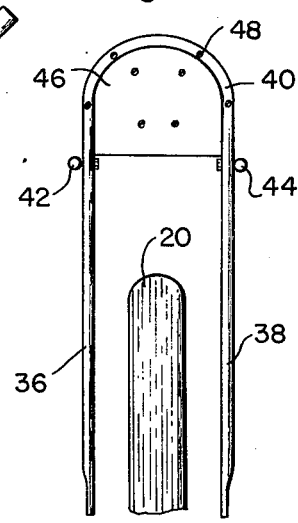

BICYCLE SAFETY AND CONVERSION WHEEL

This is a continuation-in-part of application Ser. No. 392,267 filed Aug. 28, 1973, and now abandoned.

BACKGROUND

This invention is directed to a structure for attachment to a conventional bicycle to increase the safety of riding of the bicycle and to provide another manner in which the bicycle can be safely ridden.

One design of modern bicycles is provided with relatively small wheels and a relatively high seat, with the seat positioned well rearwardly on the bicycle. In normal riding, with both conventional wheels on the ground, the net center of gravity of the bicycle and its rider is just forward of the rear axle. This arrangement permits the bicycle to be ridden on only its rear wheel, with the front wheel raised. In modern parlance, this is called a "wheelie" by the youth. One of the bicycle models which is particularly suitable for use in performing the wheelie is the "Sting-Ray" bicycle. However, to successfully perform a wheelie, all that is needed is an arrangement whereby the front wheel can be raised so that the net center of gravity is over the rear axle, while affording a fair comfort to the rider.

SUMMARY

In order to aid in the understanding of this invention, it can be stated in essentially summary form that it is directed to a bicycle safety and conversion structure which includes a supplemental wheel attached to the bicycle and positioned so that, when a wheelie is performed on the bicycle, the wheel on the bicycle safety and conversion structure prevents the bicycle from tipping over backward.

It is thus an object of this invention to provide a bicycle safety construction which prevents the bicycle from tilting over backward during the performance of a wheelie. It is another object to provide a bicycle safety structure having a wheel which engages the ground to the rear of the principal rear wheel only when the net center of gravity of the bicycle and rider is to the rear of the rear axle.

It is another object of this invention to provide a bicycle conversion wheel attached to the rear of a bicycle and arranged so that the bicycle can be ridden in an unconventional manner with a conversion wheel and the rear bicycle wheel on the ground. It is yet another object to provide a bicycle conversion wheel which has a step platform thereon so that the rider can put his foot on the step platform and propel himself while supported by the conversion wheel and rear bicycle wheel.

Other objects and advantages of this invention will become apparent from a study of the following portion of the specification, the claims, and the attached drawings.

BRIEF DESCRIPTION OF THE DRAWINGS

FIG. 1 is a side-elevational view of a bicycle having the bicycle safety and conversion wheel structure of this invention attached thereto, with the rear bicycle wheel and the conversion wheel in ground engagement;

FIG. 2 is a partial side-elevational view, on reduced scale, showing the orientation of the bicycle and the structure of this invention when the front and rear bicycle wheels are in ground engagement;

FIG. 3 is an enlarged partial rear-elevational view, showing only the preferred embodiment of the wheel structure and its mounting;

FIG. 4 is a partial top-plan view, showing a portion of the rear wheel and a portion of the safety and conversion wheel mounting structure;

FIG. 5 is a partial rear view of the bicycle, showing a second embodiment of the bicycle safety and conversion wheel structure of this invention;

FIG. 6 is a side-elevational view of a third embodiment of the bicycle safety and conversion wheel structure of this invention;

DESCRIPTION

Figure 7:
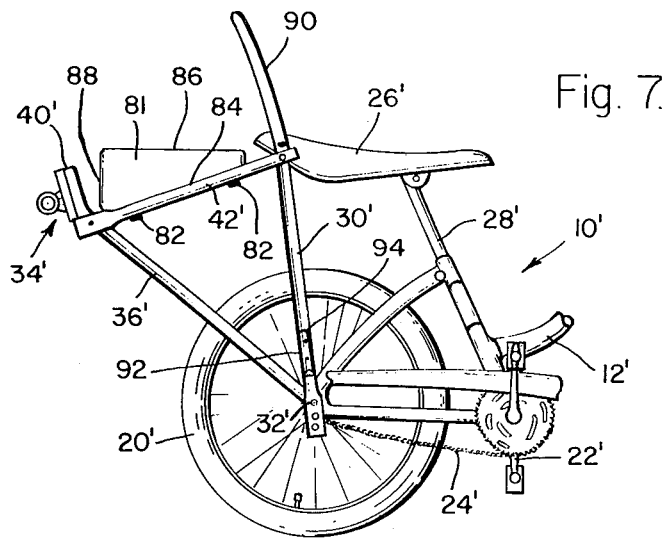
FIG. 7 is a partial side-elevational view showing an embodiment of the invention providing an auxiliary seat, passenger handle and foot pegs.

FIG. 1 illustrates a bicycle 10 which is of conventional construction. It has a frame 12 which pivotally carries front fork 14. Front wheel 16 is pivotally mounted between the prongs of the fork. The upper end of the fork carries handlebars 18 which are positioned for manual grasp for steering control.

Rear wheel 20 is pivotally mounted at the rear of the frame on a generally transverse axis. Crank 22 is also pivotally mounted upon a transverse axis. Crank 22 carries a sprocket around which is engaged chain 24. At the rear axle of rear wheel 20, chain 24 engages over a sprocket which is connected to a conventional coaster brake mechanism. This mechanism is arranged so that, when crank 22 is pedaled in the forward direction by means of attached pedals in the clockwise direction, as seen in FIG. 1, propulsive torque is coupled to rear wheel 20. On the other hand, when the crank is pedaled in the rearward direction, the brake is applied to the rear wheel. While a coaster brake mechanism is shown and described, if desired, a multiple-speed structure like a multiple sprocket Derailleur mechanism can be employed.

Seat 26 is mounted upon seat post 28 which is telescopically mounted and extends upward from the frame. Seat 26 is a fairly long seat in the front-to-back direction, and the rear of the seat is supported by seat support fork 30. At its upper end, seat support fork 30 is attached by bolts to the opposite sides of the seat and, at its lower end, it is engaged upon and secured to rear axle 32. The structure thus far described is a conventional bicycle, and particularly a bicycle of the "Sting-Ray" type which is provided with the relatively long seat 26 which is positioned well to the rear of the bicycle. When both wheels 16 and 20 are in ground engagement and the rider sits in normal position upon seat 26, pedals with crank 22, and grips handlebars 18, the net center of gravity of the rider and the bicycle is just forward of rear axle 32. This permits the rider to rock the bicycle 10 into a front wheel-up position where the net center of gravity is over the rear axle 32 in the orientation shown in FIG. 1. In this condition, the bicycle is balanced. From a stability viewpoint, it is a difficult position to maintain because an increase in propulsive torque causes the rear axle 32 to move forward, but a decrease in propulsive torque does not give corresponding control because of the coaster brake mechanism. Thus in the perfectly balanced position, it is easier to fall over backward than to fall forward.

In order to provide safety to the performer of the wheelie in this maneuver, the bicycle safety and conversion wheel structure 34 of this invention is provided. The structure comprises bars 36 and 38 which extend rearwardly from rear axle 32 and are joined by a closed loop 40. Arms 42 and 44 are respectively secured at their lower ends to bars 36 and 38 adjacent the joining loop thereof and, at their upper end, are secured at the location where seat support fork 30 is secured to the seat. All joints are made by nuts and bolts for purposes of security and to permit adjustment, attachment and removal. Plate 36 is secured at loop 40, as by means of machine screws 48, see FIG. 4, bolts, or by more permanent attachments such as rivets or welding.

In the preferred embodiment of this invention, wheel assembly 50 is secured to the bottom of mounting plate 46. Wheel assembly 50 comprises wheels 52 and 54 mounted upon a transverse axle which passes through truck 56. The wheels may be of hard composition material such as is found on skateboards and roller skates or can be of steel construction. Truck 56 is mounted on support 58 to rotate on an axis which lies in a plane perpendicular to the axis of wheels 52 and 54 and lies at an angle to the ground line passing through the contact surfaces of rear wheel 20 and wheels 52 and 54. Furthermore, the angular pivot structure, similar to that found in skateboards and roller skates is rubber-buffered to the centered position. Under these circumstances, when a wheelie is performed, further rearward motion of the center of gravity causes the wheels 52 and 54 to contact the ground, thus preventing rearward spill of the bicycle and its rider. Furthermore, the angular pivot of the wheel assembly permits steering so that tilting of the bicycle to the left or the right, as compared to its straight-ahead path, causes steering of the wheel assembly 50 to aid in maintaining balance.

Additionally, it should be noted that the loop 40 is of sufficient size to receive a foot, and plate 46 acts as a step-plate. Thus, the bicycle rider, rather than sitting on the seat 26, can place one foot on the step-plate, forcing wheels 52 and 54 to the ground, grasp handle bars 18, and propel the system as if it were a skateboard. Now, moving the handle bars 18 to the left and to the right causes tilting of the entire bicycle frame out of the vertical plane to thus cause steering of the wheel assembly 50. The system thus steers in a manner similar to a skateboard or rollerskates. The pivot axis of truck 56 on support 58 is usually at an angle of about 45° with respect to the direction of the ground plane.

In the embodiment shown in FIG. 5, the bicycle and the support structure is the same as previously described. In the embodiment illustrated in FIG. 5, wheel assembly 60 is mounted on the bottom of step-plate 46. Wheel assembly 60 comprises wheels 62 and 64 mounted upon a truck 66. Truck 66 is pivotally mounted upon support 68 which, in turn, is secured to the bottom of step-plate 46. The difference between wheel assembly 60 and wheel assembly 50 is that the pivot 70 by which truck 66 is pivotally mounted on support 68 is substantially normal to the ground plane when wheels 62 and 64, as well as rear wheel 20, are in ground engagement. The preferred angle is about 80° with respect to the ground plane. Furthermore, rubber structure is engaged between the truck and the support to resiliently maintain the axle of truck 66 substantially parallel to axle 32. Again, the wheels and mounting can be similar to that on a skateboard or roller skates, except that the pivot axis is substantially normal to the ground plane.

In the embodiment illustrated in FIG. 6, again the bicycle and the safety and conversion wheel support structure are the same. In the embodiment of FIG. 6, wheel assembly 72 is secured to the bottom of footplate 46. Wheel assembly 72 is a conventional ball caster having a preferably non-metallic ball 74. The ball caster is preferably mounted upon an axis 76 which is normal to the ground plane when the ball of the ball caster is in ground engagement.

In each of the three embodiments, it is clear that safety is enhanced by preventing rearward overturn of the bicycle, and a second mode of operation of the bicycle is achieved. The wheel assembly 50 is a preferred structure because of its steering aspects, particularly when the second mode of operation is employed. However, the wheel assemblies 60 and 72 also provide operational opportunities unrestrained by the steering feature of the wheel assembly 50.

Figure 8:
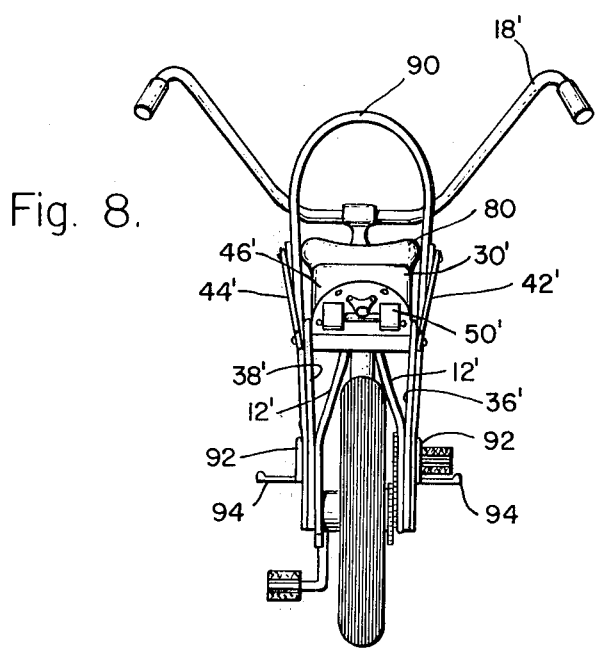
FIG. 8 is a partial rear view of the bicycle of FIG. 7.

In accordance with still another embodiment of the invention, as illustrated in FIGS. 7 and 8, a bicycle 10', similar to bicycle 10 in FIG. 1, includes a frame 12' on which is mounted a rear wheel 20', a crank 22', a chain 24', and a seat 26' mounted upon a seat post 28'. Also included in bicycle 10' is a seat support fork 30', the upper end of which is attached to opposite sides of the seat 26', and the lower end of which is preferably engaged upon and secured to a rear axle 32'. Alternately, the seat support 30' may be mounted directly to the frame 12' adjacent the axle 32'.

As in the previously described embodiments, a conversion wheel structure 34' is provided to aid in the safe performance of a wheelie. The conversion wheel structure 34' comprises bars 36' and 38' which extend rearwardly from the rear axle 32' and are joined by a closed loop 40'. Arms 42' and 44' are respectively secured at their lower ends to the bars 36' and 38' adjacent the joining loop thereof and, at their upper end, are secured at the location where the seat support fork 30' is secured to the seat 26'. Appropriate nuts and bolts are used for securing the joints where adjustment, attachment and removal are desired, and rivets or welding may be used for permanent attachment.

A plate 46' is secured at loop 40' in a manner similar to that used for plate 46 in the previously described embodiments, the plate 46' supporting a wheel assembly 50' secured to the bottom thereof, while also providing an upper horizontal, foot-supporting platform when both the wheel assembly 50' and the rear wheel 20' are in ground engagement. The wheel assembly 50' is similar to wheel assembly 50 and, therefore, will not be described in detail. Alternately, either wheel assembly 60, or 72 may be substituted.

In order to safely accommodate a passenger on the bicycle 10', an auxiliary seat 80 is secured by bolt and nut assemblies 82, or other conventional securement, to the arm 42' and 44', the seat 80 having an angled lower portion 84 whereby the upper seat portion 86 is essentially horizontal when both wheels 16' and 20' are in ground engagement. The seat 80 may be fabricated utilizing a resilient material core and covered by leather or a plastic material, as is well known in the industry. It will be noted that the rear portion 88 of the seat 80 does not extend to the loop 40' in order to allow the utilization of the foot or step-plate function of plate 46'.

As shown in FIGS. 7 and 8, the seat support 30' includes an upper loop portion 90 that extends beyond the seat 26 in the other embodiments of the invention to act as a passenger handle. This embodiment may also include foot pegs 92 secured to the lower portion of the seat support 30', the pegs 92 having pivoted portions 94 so that these portions extend horizontaly to accommodate a passenger's feet, but which may be moved to upward vertical positions when not in use.

This invention having been described in its preferred embodiments, it is clear that it is susceptible to numerous modifications and embodiments within the ability of those skilled in the art and without the exercise of the inventive faculty. Accordingly, the scope of this invention is defined by the scope of the following claims.

What is claimed is:

1. In combination with a conventional bicycle having a frame, a rotatably mounted front wheel, a rear axle secured to said frame, a rear wheel rotatably mounted on said rear axle, a seat post, a seat mounted in said seat post, and a seat support structure having two distal ends, one of said distal ends connected to said seat and the other of said distal ends connected to said frame adjacent said rear axle, said bicycle having a stable mode of operation with both conventional wheels in ground contact and a semi-stable "wheelie" mode of operation; the improvement comprising: elongated bar structure fixedly secured to said frame adjacent said rear axle and arm structure relatively shorter than said bar structure fixedly secured to said seat adjacent said seat support structure, said arm structure and said bar structure being fixedly secured together higher than said rear axle when in said stable mode of operation, a mounting plate carried by said arm structure and bar structure adjacent their securement, an auxiliary seat mounted on said arm structure between said seat and said mounting plate to accommodate a passenger thereon, and a wheel assembly mounted on said mounting plate, said wheel assembly having a safety wheel thereon so that said bicycle can be operated in said semi-stable mode of operation with said safety wheel and said rear wheel in ground engagement.

2. The combination of claim 1, wherein the rear portion of said seat is spaced from said mounting plate allowing foot access to said mounting plate.

3. The combination of claim 1, wherein the upper portion of said seat is essentially horizontal when in said stable mode of operation.

* * * * *